(12) United States Patent
Caire et al.

(10) Patent No.: US 9,020,907 B2
(45) Date of Patent: Apr. 28, 2015

(54) METHOD AND SYSTEM FOR RANKING AFFINITY DEGREE AMONG FUNCTIONAL BLOCKS

(75) Inventors: Giovanni Caire, Turin (IT); Danilo Gotta, Turin (IT); Andrea Pinnola, Turin (IT); Giovanna Sacchi, Turin (IT)

(73) Assignee: Telecom Italia S.p.A., Milan (IT)

( * ) Notice: Subject to any disclaimer, the term of this patent is extended or adjusted under 35 U.S.C. 154(b) by 34 days.

(21) Appl. No.: 13/519,995

(22) PCT Filed: Dec. 30, 2009

(86) PCT No.: PCT/IT2009/000591
§ 371 (c)(1),
(2), (4) Date: Sep. 14, 2012

(87) PCT Pub. No.: WO2011/080772
PCT Pub. Date: Jul. 7, 2011

(65) Prior Publication Data
US 2012/0330940 A1    Dec. 27, 2012

(51) Int. Cl.
*G06F 7/00*    (2006.01)
*G06Q 10/06*    (2012.01)

(52) U.S. Cl.
CPC ...................... *G06Q 10/06* (2013.01)

(58) Field of Classification Search
USPC .............. 707/999.101, 999.102, 735, 690
See application file for complete search history.

(56) References Cited

U.S. PATENT DOCUMENTS

| 6,038,538 | A | 3/2000 | Agrawal et al. |
| 2008/0126987 | A1 | 5/2008 | Meschian et al. |
| 2008/0244526 | A1 | 10/2008 | Chang et al. |
| 2010/0063948 | A1* | 3/2010 | Virkar et al. ............... 706/12 |
| 2011/0113008 | A1* | 5/2011 | Jafri et al. ............... 707/608 |

FOREIGN PATENT DOCUMENTS

WO    WO 2008/119650 A2    10/2008

OTHER PUBLICATIONS

European Office Action dated Nov. 21, 2013, in corresponding application No. 09 807 683.9-1955.
English-language International Search Report issued by European Patent Office in International Application No. PCT/IT2009/000591, mailed Sep. 7, 2010 (2 pages).

* cited by examiner

*Primary Examiner* — Hosain Alam
*Assistant Examiner* — Eliyah S Harper
(74) *Attorney, Agent, or Firm* — Oblon, McClelland, Maier & Neustadt, L.L.P.

(57) ABSTRACT

A methodology for assisting a user in a combination of functional blocks by defining a value representative of an affinity degree among the functional blocks. Such affinity degree is influenced by available historic data derived by previous uses of the functional blocks which had been recorded into a repository.

15 Claims, 7 Drawing Sheets

METHOD AND SYSTEM FOR RANKING AFFINITY DEGREE AMONG FUNCTIONAL BLOCKS

CROSS REFERENCE TO RELATED APPLICATIONS

This application is a national phase application based on PCT/IT2009/000591, filed Dec. 30, 2009, the content of which is incorporated herein by reference.

FIELD OF THE INVENTION

The present invention relates to the data processing field and more particularly to a method and system for evaluating and ranking an affinity degree among functional blocks in a workflow definition and execution environment, such as for example web services.

BACKGROUND OF THE INVENTION

An increasing quantity of information and of tools for accessing such information (e.g. multimedia items) is being made available by the recent widespread diffusion of advance communications technique and infrastructures and also by the convergence between the world of information technology and the world of media and entertainment. As a consequence an increasing number of formats, interfaces and access protocols must be dealt with at the same time. In this environment it is extremely important the availability for the users (in particular for those who are not technically skilled) of fast and intuitive tools for combining different components together. It is more and more usual to implement the combination of components with the use of MashUp, i.e. a combination of contents or services from one or more applications, which creates a new application that can include topics, information and services from several different sources. Mashup combines some of the most innovative features of Web 2.0: the vision of the network as a platform where, thanks to shared protocols, applications are able to communicate with each other, the tendency on the part of best known web sites to make contents and services freely available, and the participation of users, who increasingly become independent producer of contents and services. The result of a MashUp can be unique and unprecedented, especially for the opportunity to mix different information types, and it can be really innovative if you make available tools that allow an easy MashUp design and creation also to users with minimal technical knowledge. The Gadget of Google Desktop and Pipes of Yahoo are two examples of this important technology trend in Web 2.0 context.

Similarly in the context of large enterprise organizations, operational processes are evolving and changing so rapidly that it's more and more difficult to adapt real time operation support systems in real time. This is even more difficult considering heterogeneous and ever-changing needs of people involved in operational processes. Such complexity makes it really hard to meet all the requirements and suggestions when developing workflows which guide operational activities. This implies that for a lot of critical activities and issues every operator/technician or group of operators/technicians often find ad-hoc solutions and implement them themselves. As a consequence these solutions can only be used by a restricted set of users thus preventing a proper spreading of individual knowledge.

Furthermore Web Services technologies, which can be well considered de facto standard for system integration, provide some basic components: a sort of commonly understood language for defining access interfaces for accessing a service through the web, independently from the implementing technology actually used and a set of protocols integrated with the Web environment for invoking the service.

However, even though Web Services technique ensures the syntactic compatibility for systems communications, they still have strict limitations as far as the semantic characterization is concerned.

Several attempts have been made in the area of Semantic Web to try to define rules and standards for a semantic characterization of a web service or a system. E.g. languages such as OWL-S and SAWSDL allow to describe the semantic of an operation performed through a Web Service and of the related input and output, by defining a set of ontologies. Ontology is a well known concept in the field of Artificial Intelligence, particular in knowledge representation for formally defining semantic concepts in a specific domain and the relationships among those concepts.

Even though OWL-S and SAWSDL languages can represent a valid solution for supporting creation of basic functional blocks, they show strong limitations in relation to maintenance/updating of the represented knowledge. In the field of social network analysis it is becoming common to use the so-called folksonomies for assigning semantic meanings. In particular a folksonomy describes a characterization of information being generated by users of social networks through the use of keywords (or tag) freely selected by the users themselves. The term folksonomy is a neologism composed by the words "folk" and "tassonomy"; a folksonomy is therefore a tassonomy which has been created by the user of the information according to subjective criteria.

Folksonomies allow to overcome the problems of maintenance/updating of the ontologies, usual in the Semantic Web approach, however they are characterized by a degree of redundancy and lack of structure which render them rather difficult to handle. Patent Application WO2008/119650 describes an example of using folksonomies to implement a system for facilitating the creation/modification of business processes with the help of a knowledge base including a collaborative classification system which stores information regarding a group of services usable by composition applications.

It would be highly desirable a reliable tool which is able to assist a user in the composition of functional blocks in order to avoid discovering, at a later stage, that they are not really compatible from a "semantic" point of view.

SUMMARY OF THE INVENTION

According to a first aspect of the present invention there is provided a method of evaluating an affinity degree between a first functional block of a plurality of functional blocks in a computer implemented workflow execution environment, and at least a second functional block of the plurality of functional blocks, the workflow execution environment allowing the combination of functional blocks in order to create workflow processing applications wherein functional blocks exchange information data through input/output interface parameters, the affinity degree being indicative of the likelihood that the combination of the first and the second functional block is successful, the method including: maintaining a repository of historic data representing a plurality of previously executed combinations of a set of functional blocks of the plurality of functional blocks, wherein a data record is associated to each previously executed combinations, the data record including information on the successfulness of previously executed combination; responsive to a user selecting a first and a second functional blocks of the plurality of functional blocks, searching in the repository of historic data occurrences of previously executed combinations including the first and the second functional block; determining an affinity degree between the first and the second functional block according to the historic data.

In a second aspect of the invention the evaluation of the affinity degree is performed only after checking the syntactic compatibility between the functional blocks, i.e. a check whether the output interface parameters of the first functional block are compatible with the input interface parameters of the second functional block.

In a further aspect of the invention data records associated to each previously executed combination include information on the number of times the set of functional blocks has been combined and on the number of times the previously executed combination was successful.

In another aspect of the present invention the syntactic compatibility value includes an indication of input and output parameters having the same data structure.

In a further aspect of the invention the affinity degree is composed of a static element, indicative of the number of times the selected functional blocks were combined together, and a dynamic element indicative of a success rate of previously executed occurrences of the selected combination.

In another aspect of the invention the affinity degree can have positive, zero or negative value, indicative respectively of a likelihood of successful execution, a neutral expectation and a likelihood of failing execution once the selected workflow processing application is executed.

In yet another aspect of the present invention the affinity degree is adjusted according to a social affinity value which depends on tagging and rating assigned by users.

A still further aspect of the present invention provides a computer program for performing the above described method.

The present invention provides a methodology for assisting a user in the combination of functional blocks by defining a value representative of an affinity degree among the functional blocks. Such affinity degree is influenced by available historic data derived by previous uses of the functional blocks which had been recorded into a repository.

Further embodiments of the invention are provided in the appended dependent claims.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which:

FIG. 3b shows a schematic representation of a modified Knowledge Base data model suitable for implementing the alternative embodiment represented in FIG. 3a;

DETAILED DESCRIPTION

As mentioned above, the present invention aims at defining a value indicative of an Affinity Degree between couples of functional component blocks in a MashUp environment. More complex combinations of affinity evaluation are possible, e.g. affinity among a group of functional component blocks, but usually they start from the affinity degree between couples of functional blocks. In a preferred embodiment of the present invention such Affinity Degree (or Affinity score) can be represented with positive, neutral or negative value to give an intuitive indication of the likelihood that the combination of such couple of functional blocks can give good results or not. Not only in a "syntactic" way, but also from a "semantic" point of view. With syntactic combination we mean the consistency between the format (e.g. a String or an Integer) used to represent given data while with semantic compatibility we mean consistency between the meanings of those data. Just to make an example, two functional blocks could be perfectly compatible from an interface point of view, so that they can exchange information in the right format, but nevertheless will not bring to any useful results because the content of such information do not "match" with each other. The example represented in the following description makes reference to a MashUp environment where a plurality of Web Services can be combined together for a succession of data processing: they need to be "physically" combined to create the full flow of data processing where one (or more) web service is invoked, but they also need to provide the right service, i.e. the correct processing in term of expected results. However other implementations are possible with the same architecture, e.g. employing technologies such as CORBA instead of Web Services to define the interfaces of functional blocks and to invoke them.

In a preferred embodiment of the present invention, with the term MashUp it is here meant Web applications which are created by combining several Web Services. With the term MashUp Environment it is here meant a web application which facilitates both the creation of MashUps (including processing flows combined together into a single MashUp) and the execution of such MashUps. MashUp Environments also usually provide functionalities which are often available in the world of Social Networks, such as the possibility of associating a tag (i.e. a keyword selected by a user and associated to a functional block) to Web Services or to MashUps in order to categorize such items and associating a semantic characterization.

One of the main issues addressed by the method according to a preferred embodiment of the present invention is the evaluation of the affinity degree between pairs of functional blocks available in a MashUp Environment which allows the selection and combination of functional blocks to form complex processing flows. In a preferred embodiment of the present invention such evaluation is performed taking into account the fact that two or more functional blocks have been combined together in previously generated workflows and available historic statistics on the successfulness of the executions of such workflows. For implementing such evaluation it is necessary that the system tracks and record a fair amount of historic data. Additionally the evaluation of the affinity degree can consider the indications coming from tags previously assigned by users to the functional blocks.

The method according to a preferred embodiment is implemented in two main activities:
- definition of a Knowledge Base according to data taken from actual creation and execution of MashUp processes and optionally to Tags assigned by users during normal Social Network activities;
- access to Knowledge Base for obtaining statistic data which can assist a user in the choice of the most suitable functional block to combine with a selected one. This "user assistance" can be implemented in several different ways and can include a simple indication, guidance or even possible forced actions (e.g. denying certain combinations in view of the unlikelihood of the suitability of the attempted combination).

Figure 1A:
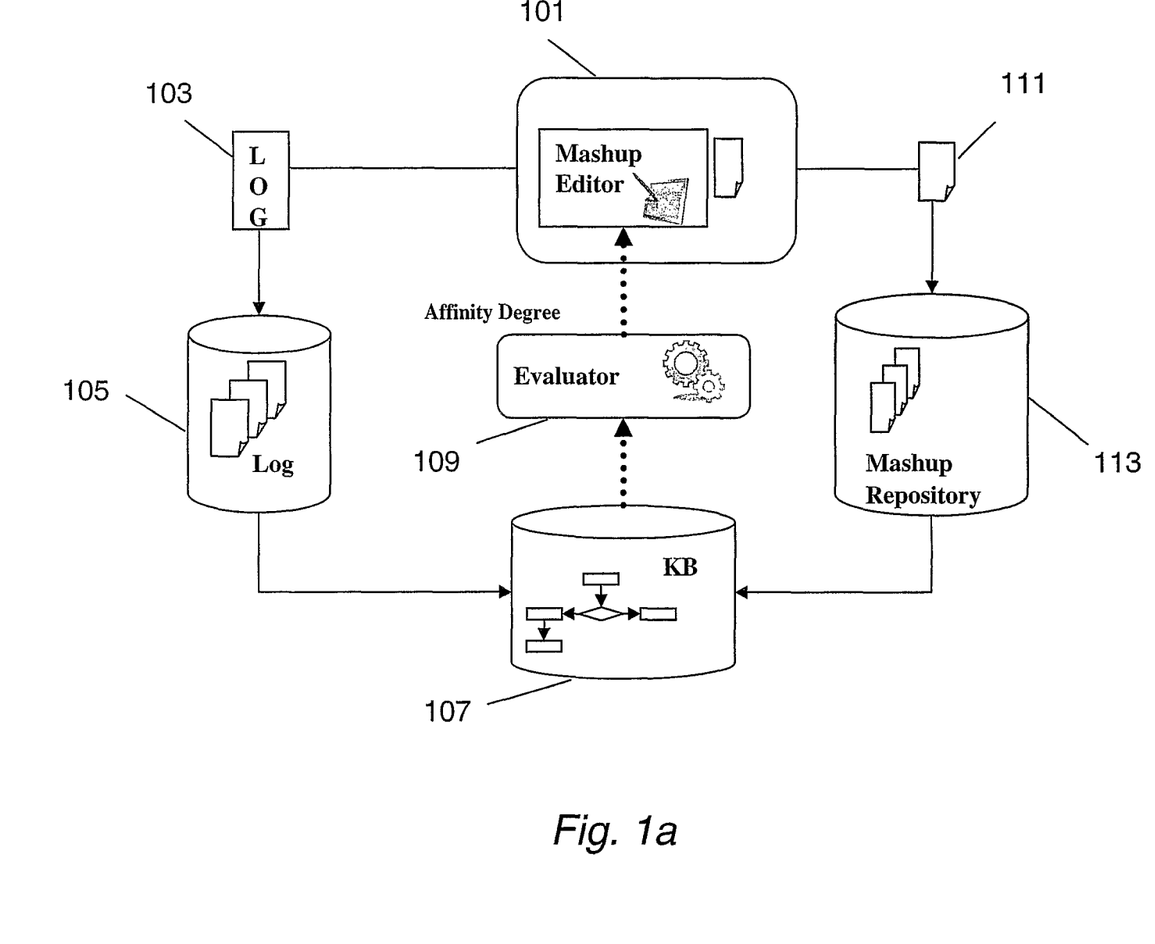
FIG. 1a is a schematic block diagram of a system implementing the method according to a preferred embodiment of the present invention.

With reference in particular to FIG. 1a, a system according to a preferred embodiment of the present invention is shown. An editor module 101 is the main interface between the users and the system, which allows a user or an administrator of the system to create/edit, execute and validate MashUps 111. These MashUps 111 are stored in an appropriate repository 113 for possible later reuse and for the creation of a Knowledge Base 107. Similarly the MashUp execution logs 103, stored in a repository 105 contribute to the Knowledge Base 107. Such Knowledge Base 107 will be accessed by an Evaluator module 109 and used as a statistic base to assist the users in future creation or modification of new MashUp combinations.

Figure 1B:
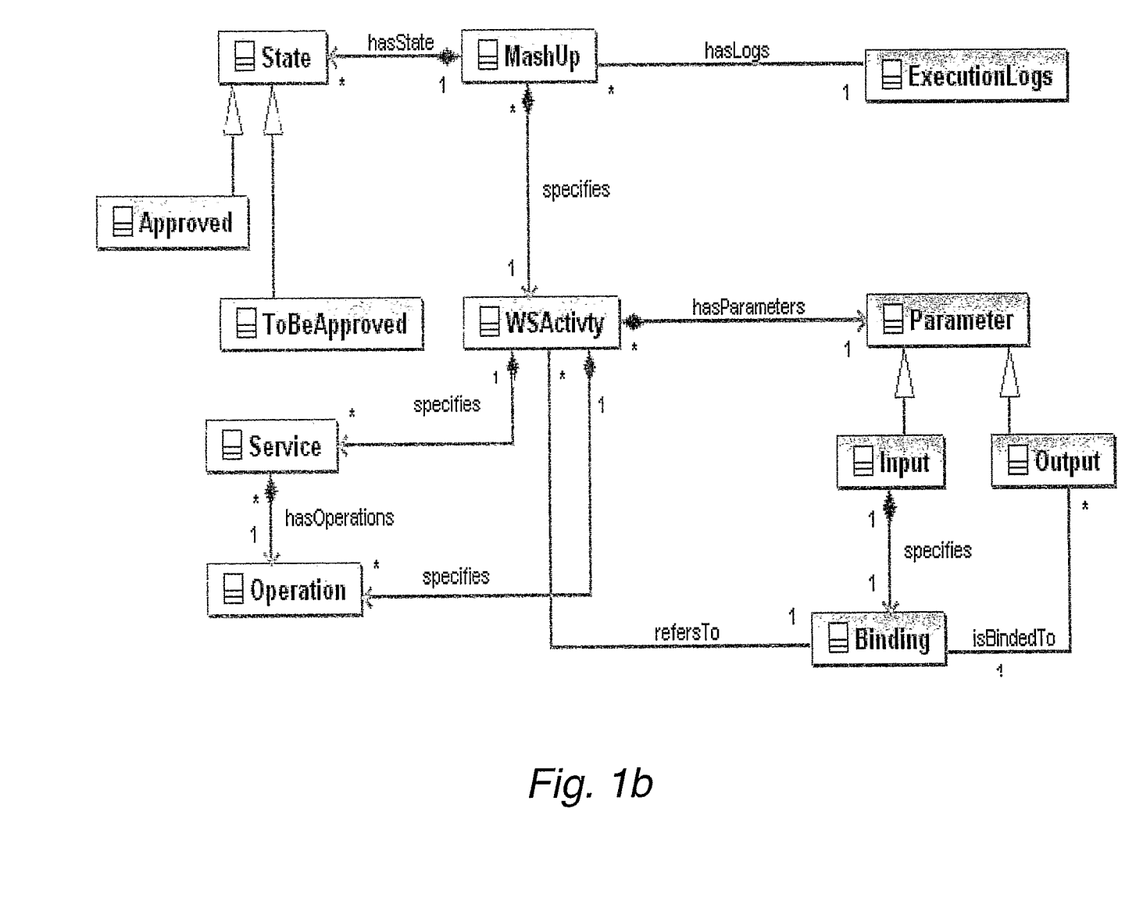
FIG. 1b is a schematic representation of a possible Knowledge Base data model suitable for implementing the present invention.

FIG. 1b shows an example of a possible data model to implement the method according to a preferred embodiment of the present invention. A MashUp is described as a sequence of web service activities, each one defining a service and an operation to invoke with a set of bindings, each one linking together an input parameter of such operation with an output parameter of another operation invoked in a previous web service activity. A MashUp can be either in Approved status (i.e. already validated by an authorised user or administrator) or in ToBeApproved status (i.e. still to be validated).

The model described above can be used to represent in the knowledge base the following example referring to the travel organization domain: we assume that Web Services are available for making reservations and arrangements for travel elements (e.g. Hotels, flights, trains, taxis, meeting rooms, interpreters).

Example 1

Let's suppose the Knowledge Base contains n MashUp instances (with n higher than a predetermined threshold) where it is possible to execute in succession the following services:
Flight Booking Service;
Taxi Booking Service;
Hotel Booking Service;
Meeting Room Booking Service.

The evaluation of affinity degree among functional blocks can rely on the availability of previously executed combinations among the same functional blocks and it would generally return a high affinity degree value, because of the compatibility among the above mentioned functional blocks. Such evaluation can then be adjusted according to a calculation based on the success rate of previously executed combinations. In other words, the more executions involving a combination between two functional blocks were recorded as successful, the higher will be the affinity between those functional blocks and therefore the higher will be the likelihood of such combination being successful.

Example 2

Let's suppose now that the following service has been invoked:
Flight_Booking (Departure, Destination, Date)
Taxi_Booking (Town)
wherein for the parameter Destination of Flight_Booking a binding has been created with the parameter Town of Taxi_Booking service.

The evaluation of the affinity degree between the two services will return a high value in consideration of the high number of previous similar combinations of the same services and bindings. In a preferred embodiment of the present invention, if the historic data (contained in the repository) show a high rate of previous successful similar combination, then the affinity degree will be increased.

On the contrary, if the historic data show e.g. problems with the selected bindings in similar previous combinations, the affinity degree value will be decreased.

It should be noted that the execution logs are very important to validate/modify the "Affinity Degree", estimated on the basis of the mere fact that some previous examples of MashUps combining two functional blocks exist. In particular such execution logs can bring to the following actions:

"Affinity Degree" Reinforcement: referring again to the Travel Booking example, let's suppose we have, in our repository, just one Mashup, where the following services are used together: Booking flight, Booking taxi, Booking hotel and Booking congress room. Based on the history available, these services should have a low "Affinity Degree", but if it is possible to deduce from the execution logs that such a Mashup has been successfully executed many times, the "Affinity Degree" must be reinforced.

"Affinity Degree" Rejection: on the contrary, a history containing a lot of Mashups where the service "A" is used together with the service "B", associated to logs always registering failures in their execution, can result in a negative "Affinity Degree"

Figure 1C:
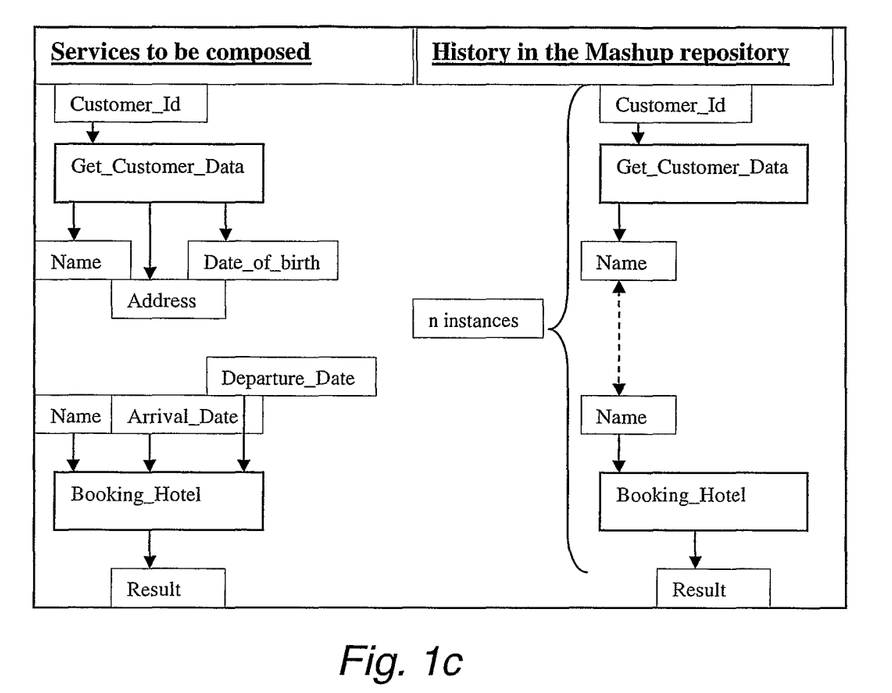
FIG. 1c schematically represents an example of implementation of a preferred embodiment of the present invention.

As an example, let's consider the case represented in FIG. 1c, where the service Get_Customer_Data retrieving customers' data from a DB has been previously combined with the Booking_Hotel service.

As shown in FIG. 1c, the name of the customer (retrieved by the Get_Customer_Data service) is passed as if it represented the name of the hotel (required in input by the Booking Hotel service). As a consequence the workflow containing that combination will fail and therefore the affinity degree between the two parameters will become negative.

It is here provided an example of how the calculation of the affinity degree could be performed starting form some input parameters. Those skilled in the art will easily appreciate that this is only one of the possibilities of implementing such evaluation and that several modifications and additions could be made to the same example formulas.

Let's suppose we want to evaluate the affinity A between two functional blocks B1 and B2.

$$A_{B1-B2} = \alpha(NK_{avg}) \frac{\sum_{i=1}^{N}\left(\varepsilon(1-\gamma_{(M_i)})K_i + \beta_{(M_i)}\frac{\sum_{j=1}^{M_i}E_{i-j}K_i}{M_i}\right)}{NK_{avg}}$$

Where:

N is the number of workflows in which B1 and B2 are combined together.

$K_i$ is the number of times B1 and B2 are combined together within the i-th workflow.

$K_{avg}$ the average values of K. that is $(K_1+K_2+\ldots+K_N)/N$ $M_i$ is the number of time the i-th workflow has been executed.

$E_{i-j}$ represents the result of the j-th execution of the i-th workflow. In particular it is +1 if such execution succeeded and −1 if such execution failed.

α(x), β(x) and γ(x) are functions that evaluate to 0 for x=0 and grow asymptotically to 1 as long as x grows. As an example we could have $$\alpha(x) = 1 - \frac{1}{x+1}$$

ε is a constant between 0 and 1.

It can be noticed that the contribution to the affinity between B1 and B2 of each workflow depends on two parts
- A "static" part (always positive) capturing the idea that by the very fact that B1 and B2 were combined together there is an affinity between them.
- A "dynamic" part (positive or negative) capturing the idea that if the execution of a workflow where B1 and B2 were combined succeeds the affinity between B1 and B2 is enforced, while if that execution failed the affinity is weakened.

The weights of the static and dynamic parts clearly vary as long as the number of executions of the i-th workflow $M_i$ grows. More in details the weight of the static parts decreases while that of the dynamic part increases.

Finally it should be remarked that the presented formula addresses the "statistic affinity" between two functional blocks, i.e. the affinity that can be derived from statistic information on previous usages of such functional blocks. According to another embodiment of the present invention, which will be described in the following, the overall affinity can be adjusted with the introduction of a "social affinity", where the second elements takes into account the semantic meaning (if any) explicitly associated to the functional blocks by the users by means of tagging and rating mechanisms.

Figure 2:
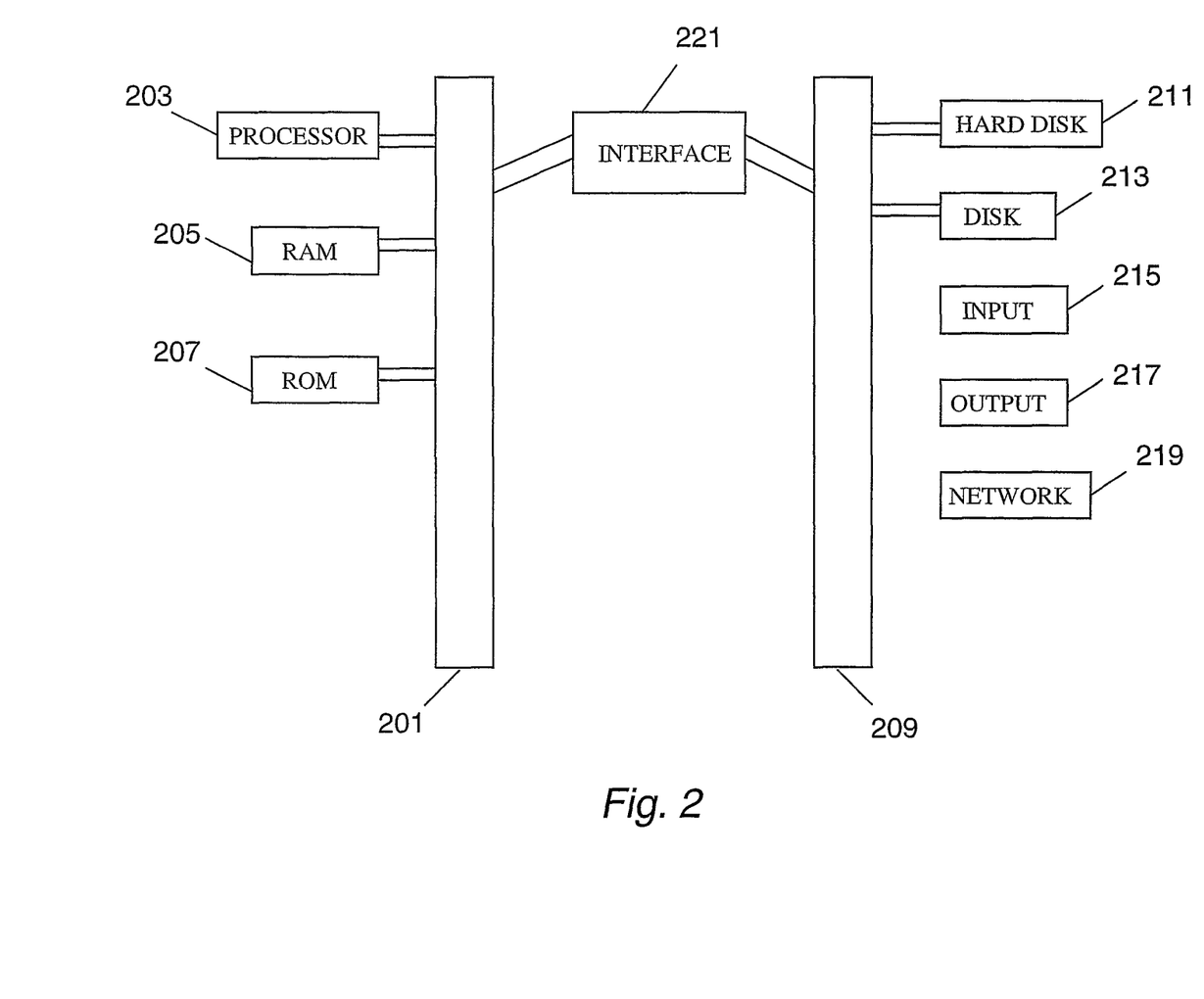
FIG. 2 shows the components of a generic computer system used in the preferred embodiment of the invention.

As shown in FIG. 2, a generic computer of the system (e.g. computer unit, central server, file system) is denoted with 200. The computer 200 is formed by several units that are connected in parallel to a system bus 201. In detail, one or more microprocessors 203 control operation of the computer 200; a RAM 205 is directly used as a working memory by the microprocessors 203, and a ROM 207 stores basic code for a bootstrap of the computer 200. Peripheral units are clustered around a local bus 209 (by means of respective interfaces). Particularly, a mass memory consists of a hard-disk 211 and a drive 213 for reading CD-ROMs. Moreover, the computer 200 includes input devices 215 (for example, a keyboard and a mouse), and output devices 217 (for example, a monitor and a printer). A Network Interface 219 is used to connect the computer 200 to the network: the network can be either a wired network or a wireless telecommunication network. An interface 221 put in communication the system bus 201 with the local bus 209. Each microprocessor 203 and the interface unit 221 can operate as master agents requesting an access to the system bus 201 for transmitting information.

Similar considerations apply if the system has a different topology, or it is based on other networks. Alternatively, the computers have a different structure, include equivalent units, or consist of other data processing entities (such as PDAs, mobile phones, and the like).

Figure 3A:
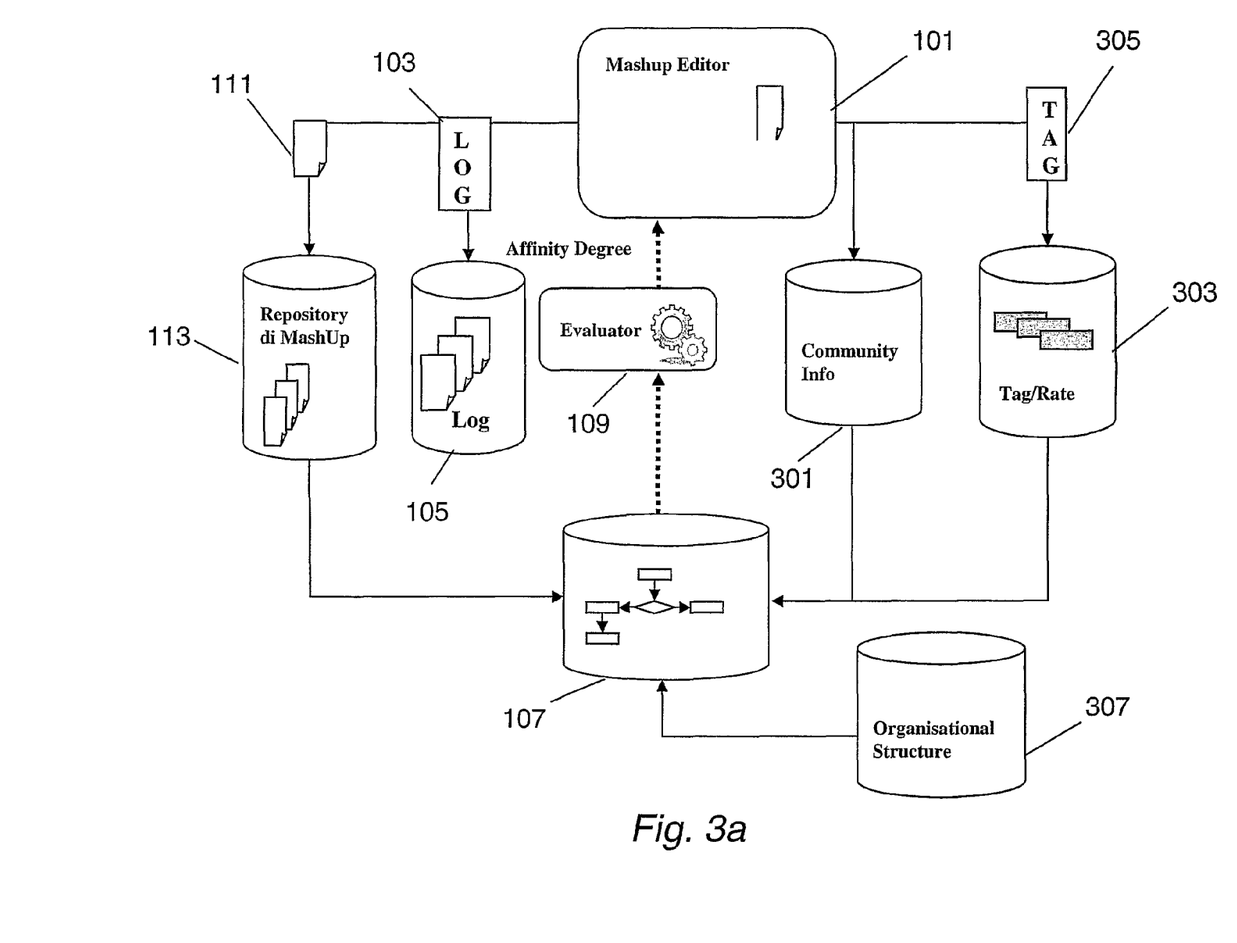
FIG. 3a shows a possible alternative implementation of the present invention, including an advanced Knowledge Base which takes into account additional information obtained by Social Network functionalities.

With reference to FIG. 3a, an alternative system according to an embodiment of the present invention is shown. The system of FIG. 3a includes the components shown on the system of FIG. 1a: an editor module 101 which facilitates the creation and the execution of MashUps; a Log 103 for storing MashUp execution logs in a repository 105 for possible later reuse; a Knowledge Base 107 which will be accessed by an Evaluator module 109 and used as a statistic base to assist the users in future creation or modification of new mush up combinations; a MashUp 111 created using the editor module and stored in the MashUp repository 113 for possible later reuse. In addition, the system described in FIG. 3a includes the following elements:
- a Community Info database 301 which includes information on the Community to which the user belongs;
- a Tag/Rate repository 305 where user assigned Tags and Rates, referred to specific Web Services and MashUps, are stored;
- an Organisational Structure database 307 which contains information on the Organisational Structure of the user and can be used to tune the Affinity Degree evaluation.

In this alternative implementation the evaluation of affinity degree made by the Evaluator 109 can be influenced by information derived from the Social Community to which the user creating the MashUps, belongs.

This additional evaluation step can be implemented as a sort of Phase 2 evaluation, which refines the base evaluation.

In particular the system described in FIG. 3a exploits the following kind of information:
Tag which are created by the user and associated to specific MashUps and Web Services. By assigning a Tag, a user can assign in a simple way a semantic to a Web Service or to a MashUp and such semantic can be used to integrate or to weigh the previous evaluations of the Affinity Degree made on the basis of the available statistics;
Rate (an evaluation of the web service in a given range, e.g. from 1 to 10): these are assigned by the user and, as in the case of Tags, they can be used to integrate or to weigh previous evaluations of the Affinity Degree made on the basis of the available statistics;
Organisational Structure: this information can give useful indication on the environment to which the user belongs and can influence the evaluation of Affinity Degree between functional blocks according to user's preferences;
Community: this information is related to the Community to which the user belongs. It can be either explicitly indicated by the user or automatically deduced by the system according to previous activities performed by the same user (e.g. access to specific Web Services or MashUps or assignment of certain Tags or Rates) or explicitly indicated by the user himself, e.g. by means of subscriptions. As in the previous case, this information can influence the evaluation of Affinity Degree between functional blocks and provide an additional indication of user's interests.

Those skilled in the art will easily appreciate that different system architecture, different or additional modules and different or additional information can be used to implement the present method also taking into consideration specific user needs and system peculiarities.

Figure 3B:
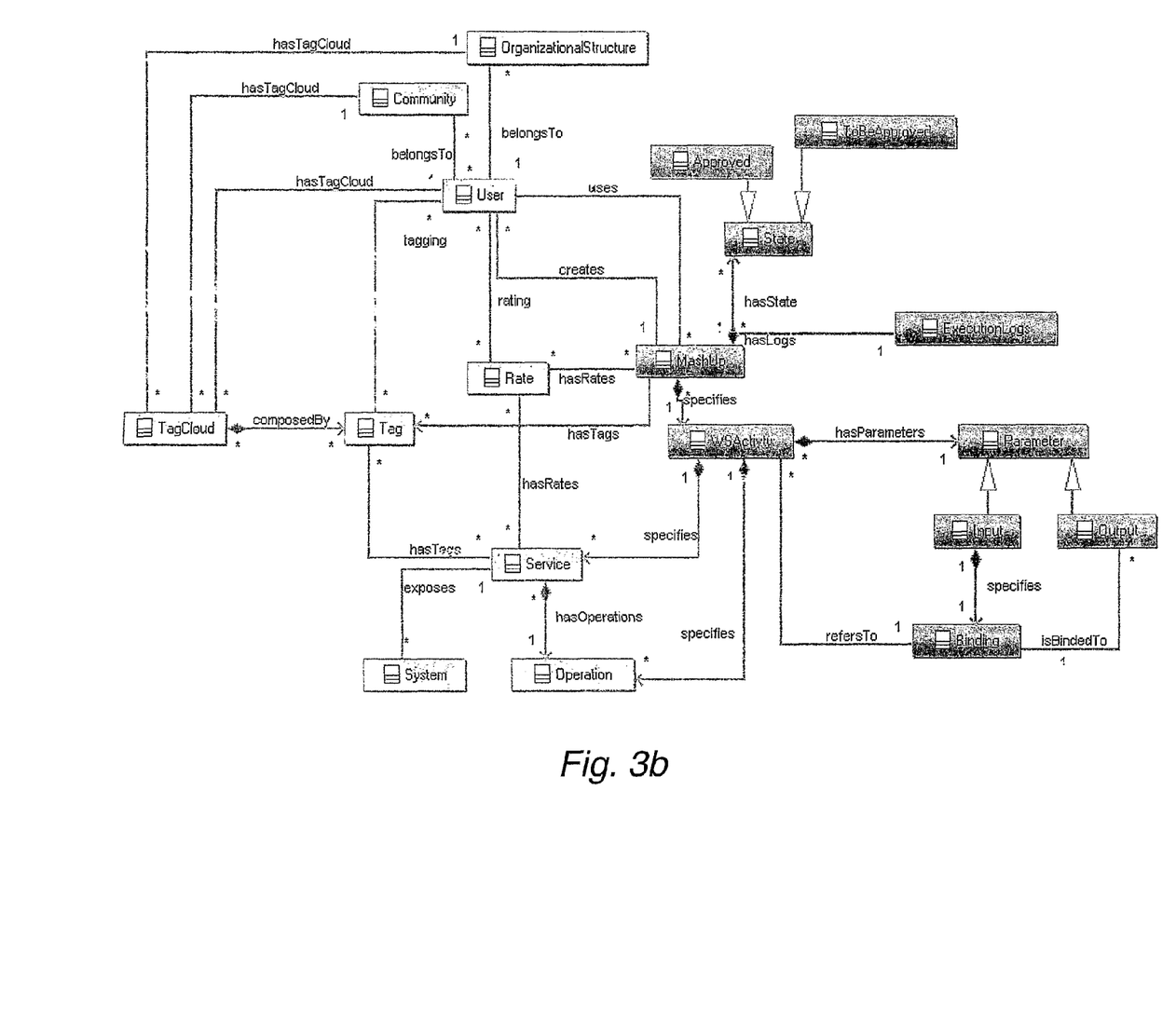

FIG. 3b represents an evolution of the Data Model represented in FIG. 1b which takes into account the influence of the Social Network parameters described with reference to FIG. 3a. In particular, in addition to the components illustrated in FIG. 1b, proper concepts have been included to model tags and rates as well as the community to which the user belongs and the IT systems of the organization.

An additional optional feature is the introduction of a format transformation function which takes into account the needs of applying a format transformation before properly combining the services into a MashUp. For instance, considering again the booking travel example, a Mashup calling the following services:

Booking_Flight (departure, destination, date)
Booking_Hotel (city, arrival_date, departure_date), where the format of the parameter "date" is year/month/day and the format of the parameter "arrival_date" is day/month/year, must use a transformation function between these two formats before binding the "date" and the "arrival_date" parameters.

From the point of view of the present embodiment of the invention, transformation functions are on the one hand very important to make the Mashup work; on the other hand they are not meaningful, because they are not semantically related to the application domain.

Figure 4:
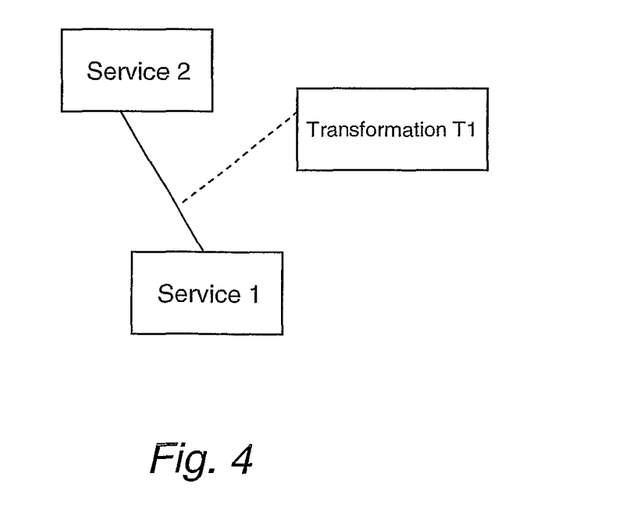
FIG. 4 shows a diagram representing the feature of transformation function identification according to an embodiment of the present invention.

The optional feature here described takes into account this point and provides support for transformation functions identification: for example, it is possible to detect transformation functions, considering that they usually involve just one input and output parameter. Moreover also the user tags can be exploited for their identification and, at last, transformation functions can be discriminated directly by the user at editing level. For instance, the user can directly bind two parameters, even if their formats are different, and specify that a transformation function is necessary, as it is shown in FIG. 4.

The "Affinity Degree" is, therefore, calculated only for significant services and, at the same time, the user is automatically advised to use a transformation function, when he/she tries to connect each other two services that in the Mashups history have been connect many times through a transformation function.

Figure 5:
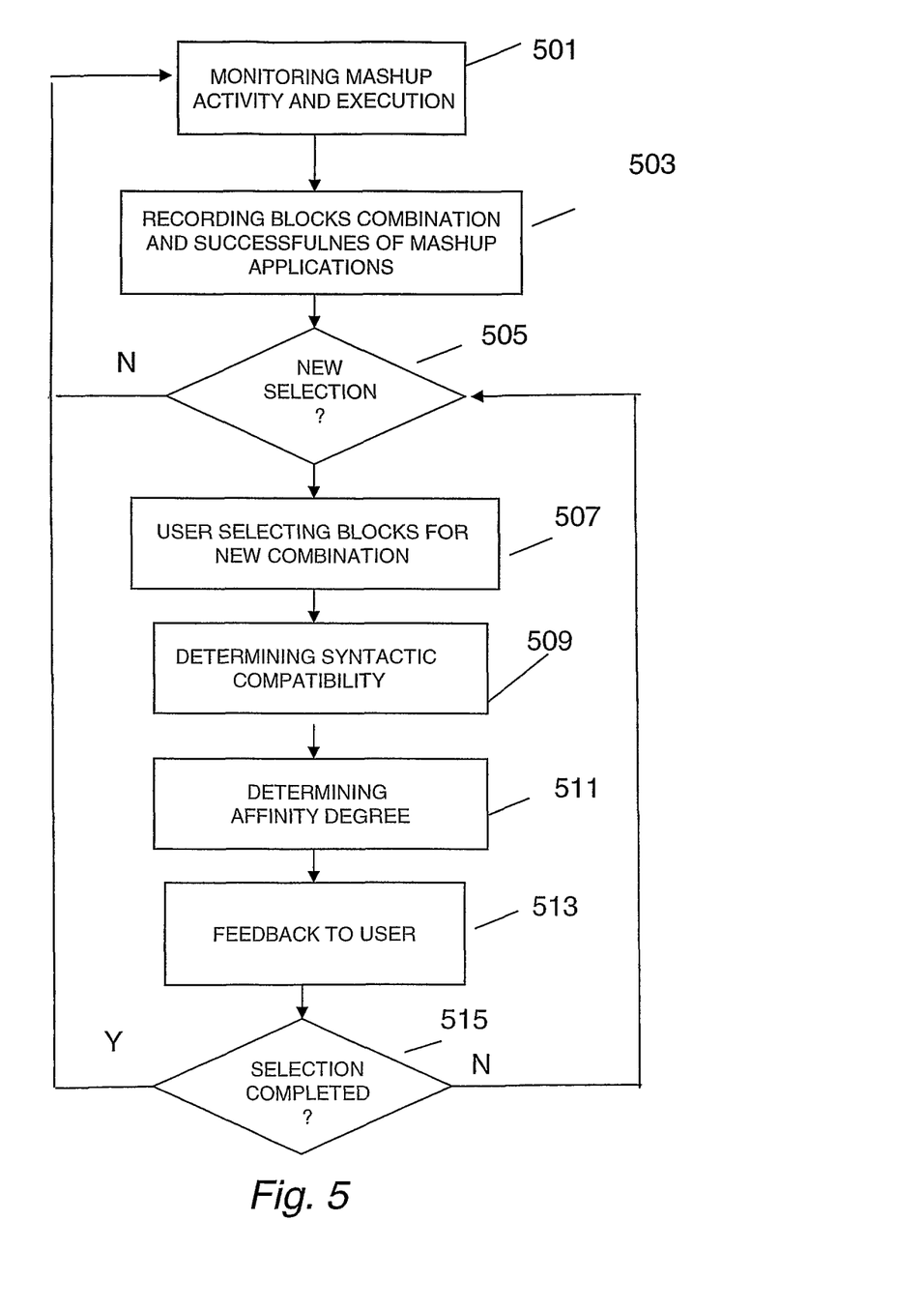
FIG. 5 shows a diagram describing the flow of activities relating to an illustrative implementation of the method.

With reference to FIG. 5, the logic flow of a method according to an embodiment of the invention is illustrated with a diagram. The method has been described with reference to a MashUp environment, and the functional blocks are meant to represent WebServices, but as mentioned above, this example should not be taken as a limitation, e.g. other kind of implementations and environment could be used instead. The method begins at box 501 where the system monitors the MashUp activities, such as creation, editing and execution of functional block combinations, e.g. Web Services. As described above a repository will be updated to contain the historic data about the combinations and also which of those combinations were successful, i.e. which combinations resulted in a proper process flow which has been executed in the MashUp environment (step 503). Those skilled in the art will appreciate that many different ways of collecting and storing data to build a history data base can be used to implement this step. Continuing to box 505, a user is provided with a development environment for creating, editing and validating the combinations of functional blocks (MashUps) and for executing the resulting applications. If a new selection of functional blocks is requested by the user the control goes to step 507. A user interface will allow the user to select two or more functional blocks to be combined together. At step 509 the syntactic compatibility of the functional blocks is verified. According to a preferred embodiment of the present invention this verification is based on structural characteristics of the functional blocks, e.g. the data structures of the input/output parameters. It is typically necessary that the input/output interfaces of the functional blocks are compatible one each other. At box 511, an affinity degree between functional blocks is determined, according to available historic data, i.e. if two (or more) functional blocks were previously combined and, more important, if such combination resulted in a successful execution the degree will be given a positive value. As mentioned above, many combinations of calculations and formulas are possible to implement this affinity degree value, which can be even negative to show a negative recommendation to the user towards the proposed combination. The recommendation is then communicated to the user through a user interface (box 513). The user interface can be tuned according to user preferences and can include many different options form a simple feedback (e.g. a visual feedback) to a proper impediment to combine two functional blocks, when the affinity degree is particularly low or negative. If the selection is then completed and accepted (or validated) by the user (step 515), the control goes back to box 501 and the historic data base will be updated accordingly, otherwise the user is offered the option of a new selection. When the resulting applications will be executed, further information about the successfulness of such execution will be collected by the system and used to improve (update) historic data for future reuse.

The invention or part of it can take the form of an entirely hardware embodiment, an entirely software embodiment or an embodiment containing both hardware and software elements. In a preferred embodiment, part of the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of evaluating an affinity degree between a first functional block of a plurality of functional blocks in a computer implemented workflow execution environment, and at least a second functional block of the plurality of functional blocks, the workflow execution environment allowing a combination of functional blocks in order to create workflow processing applications, comprising:
maintaining a repository of historic data representing a plurality of previously executed combinations of a set of functional blocks of the plurality of functional blocks, wherein the functional blocks exchange information data through input/output interface parameters, wherein a data record is associated with previously executed combinations, the data record comprising information on successfulness of previously executed combinations;
responsive to a user selecting a first and a second functional blocks of the plurality of functional blocks, searching in the repository of historic data occurrences of previously executed combinations comprising the first and the second functional blocks; and
determining the affinity degree between the first and the second functional blocks according to the historic data, the affinity degree being indicative of a likelihood that a combination of the first and the second functional blocks is successful such that there is a binding between at least one input/output interface parameter for both the first and the second functional blocks.

2. The method of claim 1, further comprising:
before searching in the repository, evaluating a syntactic compatibility value between the first and the second functional blocks, indicative of the output interface parameters of the first functional block being compatible with the input interface parameters of the second functional block; and
responsive to the syntactic compatibility value not reaching a predetermined threshold, assigning a negative value to the affinity degree.

3. The method of claim 1, further comprising:
providing a feedback to a user, through a user interface, according to a determined affinity degree.

4. The method of claim 3, wherein, responsive to the affinity degree not reaching a predetermined threshold, preventing the combination between the first and the second functional blocks.

5. The method of claim 1, wherein data records associated with each previously executed combination comprise information on a number of times a set of functional blocks has been combined.

6. The method of claim 1, wherein data records associated with previously executed combinations comprise information on a number of times the previously executed combinations were successful.

7. The method of claim 2, wherein evaluating the syntactic compatibility value comprises verifying that the output and corresponding input parameters have a same data structure.

8. The method of claim 2, wherein the syntactic compatibility value is a Boolean value.

9. The method of claim 1, wherein the affinity degree is corrected with a weight value which is proportional to a number of times the selected combination has been previously executed.

10. The method of claim 1, wherein the affinity degree comprises a static element, indicative of a number of times the selected functional blocks were combined together, and a dynamic element indicative of a success rate of previously executed occurrences of a selected combination.

11. The method of claim 1, further comprising:
assigning to at least a set of the plurality of functional blocks a social affinity value, indicative of a semantic meaning assigned by a user; and
responsive to the first and second functional blocks having a matching social affinity value, modifying a determined affinity degree between the first and the second functional blocks accordingly.

12. The method of claim 1, wherein the functional blocks represent web services.

13. A data processing system for evaluating an affinity degree between a first functional block of a plurality of functional blocks in a computer implemented workflow execution environment, and at least a second functional block of the plurality of functional blocks, the workflow execution environment allowing a combination of functional blocks in order to create workflow processing applications the system comprising:
circuitry configured to:
maintain a repository of historic data representing a plurality of previously executed combinations of a set of functional blocks of the plurality of functional blocks, wherein the functional blocks exchange information data through input/output interface parameters wherein a data record is associated with previously executed combinations, the data record comprising information on successfulness of previously executed combinations;
responsive to a user selecting a first and a second functional blocks of the plurality of functional blocks, search in the repository of historic data occurrences of previously executed combinations comprising the first and the second functional blocks; and
determine the affinity degree between the first and the second functional blocks according to the historic data, the affinity degree being indicative of a likelihood that a combination of the first and the second functional blocks is successful such that there is a binding between at least one input/output interface parameter for both the first and the second functional blocks.

14. The method of claim 1, wherein the affinity degree is determined based on the following formula:

$$\alpha(NK_{avg})\frac{\sum_{i=1}^{N}\left(\varepsilon(i-\gamma_{(M_i)})K_i + \beta_{(M_i)}\frac{\sum_{j=1}^{M_i}E_{i-j}K_i}{M_i}\right)}{NK_{avg}}$$

where B1 is the first functional block and B2 is the second functional block,
N is the number of workflows in which B1 and B2 are combined together, $K_i$ is the number of times B1 and B2 are combined together within an i-th workflow, $K_{avg}$ is the average values of K, that is $(K_1+K_2+\ldots+K_N)/N$, $M_i$ is the number of times the i-th workflow has been executed, $E_{i-j}$ represents the result of a j-th execution of the i-th workflow, and in particular it is +1 if such execution succeeded and −1 if such execution failed, $\alpha(x)$, $\beta(x)$ and $\gamma(x)$ are functions that evaluate to 0 for x=0 and grow asymptotically to 1 as long as x grows, and $\epsilon$ is a constant between 0 and 1.

15. A non-transitory computer readable medium that stores a program, which when executed by a computer causes the computer to perform a method of evaluating an affinity degree between a first functional block of a plurality of functional blocks in a computer implemented workflow execution environment, and at least a second functional block of the plurality of functional blocks, the workflow execution environment allowing a combination of functional blocks in order to create workflow processing applications, the method comprising:

maintaining a repository of historic data representing a plurality of previously executed combinations of a set of functional blocks of the plurality of functional blocks, wherein the functional blocks exchange information data through input/output interface parameters, wherein a data record is associated with previously executed combinations, the data record comprising information on successfulness of previously executed combinations;

responsive to a user selecting a first and a second functional blocks of the plurality of functional blocks, searching in the repository of historic data occurrences of previously executed combinations comprising the first and the second functional blocks; and determining the affinity degree between the first and the second functional blocks according to the historic data, the affinity degree being indicative of a likelihood that a combination of the first and the second functional blocks is successful such that there is a binding between at least one input/output interface parameter for both the first and the second functional blocks.

\* \* \* \* \*